United States Patent Office 2,951,046
Patented Aug. 30, 1960

2,951,046

CATALYSTS FOR DECOMPOSING HYDROGEN PEROXIDE

James William Laxton, London, England, assignor to D. Napier & Son Limited, London, England, a British company No Drawing. Filed Mar. 2, 1959, Ser. No. 796,229

3 Claims. (Cl. 252—476)

This invention relates to catalysts for decomposing hydrogen peroxide.

It is known that silver is an effective catalyst and various forms of catalyst bodies comprising silver at least on the surface have been devised for this purpose. One particular form of catalyst body comprises a mass of pellets made from powdered silver and powdered copper (about 93% silver and 7% copper) sintered together. Such pellets are porous and provide a large surface area of silver. It is believed that the copper also plays a useful part in the effective performance of such catalyst bodies in that in the highly oxidizing conditions the copper is oxidised to copper oxide, and particles of silver and of copper oxide are carried along by the stream of hydrogen peroxide decomposition products, the copper oxide particles serving to inhibit excessive build-up of silver on parts such as silver supporting gauzes downstream of the catalyst mass. Such excessive build-up may occur when copper is absent, which may have the effect of obstructing the flow. It has been found, however, that the silver-copper pellets have the disadvantage that at working temperatures substantially below the melting point of silver (961° C.) the pellets tend to collapse and coalesce. This is probably due to the fact that during the sintering process a silver-copper eutectic is formed where silver and copper particles touch, this eutectic having a melting point considerably below the melting point of silver.

It is an object of the invention to provide a catalyst for decomposing hydrogen peroxide which has the advantage of providing copper oxide in the hydrogen peroxide decomposition products without forming a silver-copper eutectic.

According to the present invention a catalyst for the decomposition of hydrogen peroxide comprises pellets consisting of powdered silver and powdered copper oxide sintered together.

The proportions of silver to copper oxide may be varied widely, a suitable range of proportions being silver—80% to 95%, copper oxide—20% to 5%.

These and other features, objects and advantages will become apparent to those skilled in the art from the following specific example, which is given in an illustrative and not in a limiting sense.

Example

A catalyst for decomposing hydrogen peroxide comprises a bed of pellets each consisting of a sintered mass containing, by weight, 91.3% silver and 8.7% copper oxide. The sintered pellets are made by mixing the stated ingredients in powdered form, in the proportions specified, forming the mixture into pellets, if desired with a binder which will volatilize at the sintering temperature, and subjecting the pellets to a sintering operation to convert each pellet into a coherent, porous mass.

These pellets have the advantage over pellets composed of silver and metallic copper in that no eutectic is formed during the sintering process and consequently the range of working temperatures of the pellets can be extended practically up to the melting point of silver. The hydrogen peroxide decomposition products flowing through the catalyst mass will entrain copper oxide, which prevents the build-up of silver on down-stream parts.

It is to be understood that numerous variations and modifications may be effected without departing from the true spirit and scope of the novel concepts and principles of this invention as set forth herein and in the appended claims.

What I claim as my invention and desire to secure by Letters Patent is:

1. A sintered pelletized catalyst for the decomposition of hydrogen peroxide consisting essentially, by weight, of 80–95 percent silver and 20–5 percent copper oxide.

2. As a catalyst for the decomposition of hydrogen peroxide 80–95 percent by weight powdered silver and 20–5 percent by weight powdered copper oxide sintered together in the form of pellets.

3. A catalyst as in claim 2 wherein said powdered silver is present in the amount of 91.3 percent and said powdered copper oxide in the amount of 8.7 percent.

References Cited in the file of this patent

UNITED STATES PATENTS

| 2,615,900 | Sears | Oct. 28, 1952 |
| 2,769,016 | Lichtenwalter | Oct. 30, 1956 |

FOREIGN PATENTS

| 507,419 | Great Britain | June 9, 1939 |